(12) United States Patent
Hayama (10) Patent No.: US 8,817,775 B2
(45) Date of Patent: Aug. 26, 2014

(54) ACCESS GATEWAY AND METHOD OF OPERATION BY THE SAME

(75) Inventor: Isamu Hayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 12/715,754

(22) Filed: Mar. 2, 2010

(65) Prior Publication Data

US 2010/0157993 A1    Jun. 24, 2010

Related U.S. Application Data

(63) Continuation of application No. PCT/JP2007/067221, filed on Sep. 4, 2007.

(51) Int. Cl.
| | |
|---|---|
| *H04L 12/66* | (2006.01) |
| *H04M 7/00* | (2006.01) |
| *G06F 15/173* | (2006.01) |
| *H04L 29/06* | (2006.01) |
| *H04L 12/56* | (2006.01) |
| *H04L 29/14* | (2006.01) |
| *H04M 7/12* | (2006.01) |

(52) U.S. Cl.
CPC ............ *H04L 65/1053* (2013.01); *H04L 69/18* (2013.01); *H04L 45/28* (2013.01); *H04L 69/40* (2013.01); *H04L 45/02* (2013.01); *H04M 7/125* (2013.01); *H04L 45/3065* (2013.01); *H04L 69/08* (2013.01); *H04L 45/22* (2013.01)
USPC ...... 370/352; 370/401; 370/395.32; 370/242; 370/245; 370/353; 709/239; 379/221.01; 379/221.02; 379/273

(58) Field of Classification Search
USPC ......... 370/352–356, 216–228, 237, 242–253, 370/466–467, 401, 395.32; 714/2, 4.2; 379/221.01–221.04, 273–274; 709/235, 238, 239; 455/445
See application file for complete search history.

(56) References Cited

U.S. PATENT DOCUMENTS

| | | | |
|---|---|---|---|
| 5,610,910 A | | 3/1997 | Focsaneanu et al. |
| 6,404,763 B1 * | | 6/2002 | Renucci et al. ............... 370/352 |
| 6,839,342 B1 * | | 1/2005 | Parham et al. ................ 370/352 |
| 6,868,080 B1 * | | 3/2005 | Umansky et al. ............. 370/354 |
| 6,928,068 B1 | | 8/2005 | Crowe et al. |

(Continued)

FOREIGN PATENT DOCUMENTS

| | | |
|---|---|---|
| JP | 10-512418 | 11/1998 |
| JP | 2002-44159 | 2/2002 |
| JP | 2006-203876 | 8/2006 |
| JP | 2006-229303 | 8/2006 |

OTHER PUBLICATIONS

International Search Report dated Jan. 8, 2008, from the corresponding International Application.

(Continued)

*Primary Examiner* — Asad Nawaz
*Assistant Examiner* — Wutchung Chu
(74) *Attorney, Agent, or Firm* — Katten Muchin Rosenman LLP (57) ABSTRACT

An access gateway containing IP telephone service functions for subscribers under an integrated access device (IAD), forming a PSTN network side speech path or IP network side speech path selectively for each subscriber, and, further automatically switching, when trouble occurs at the IP network side, the IP network side speech path to the PSTN network side speech path.

9 Claims, 7 Drawing Sheets

(56) References Cited

U.S. PATENT DOCUMENTS

| | | | |
|---|---|---|---|
| 7,065,041 B2* | 6/2006 | Sen | 370/227 |
| 7,512,114 B2* | 3/2009 | Laturell | 370/352 |
| 7,561,563 B2* | 7/2009 | Son | 370/352 |
| 7,570,632 B2* | 8/2009 | Mussman et al. | 370/352 |
| 7,656,863 B2* | 2/2010 | Wang et al. | 370/352 |
| 7,675,900 B1* | 3/2010 | Parham et al. | 370/352 |
| 7,693,136 B1* | 4/2010 | Blair et al. | 370/352 |
| 2002/0080801 A1* | 6/2002 | Derks | 370/401 |
| 2003/0039335 A1* | 2/2003 | Pharoah et al. | 379/22 |
| 2003/0214971 A1* | 11/2003 | Sheldon et al. | 370/467 |
| 2003/0235187 A1* | 12/2003 | Iwama et al. | 370/352 |
| 2004/0022237 A1* | 2/2004 | Elliott et al. | 370/356 |
| 2004/0042444 A1* | 3/2004 | Edmon et al. | 370/352 |
| 2004/0095925 A1* | 5/2004 | Cody et al. | 370/352 |
| 2005/0018662 A1* | 1/2005 | Crutcher et al. | 370/352 |
| 2005/0025134 A1* | 2/2005 | Armistead | 370/352 |
| 2006/0002380 A1* | 1/2006 | Bollinger et al. | 370/352 |
| 2006/0159129 A1* | 7/2006 | Schmidt | 370/493 |
| 2006/0182089 A1 | 8/2006 | Azuma | |
| 2006/0221942 A1* | 10/2006 | Fruth et al. | 370/356 |
| 2006/0262775 A1* | 11/2006 | Lobig | 370/352 |
| 2006/0271695 A1* | 11/2006 | Lavian | 709/229 |
| 2007/0036142 A1* | 2/2007 | Veschi et al. | 370/352 |
| 2007/0071020 A1* | 3/2007 | Kitayama | 370/401 |
| 2007/0160058 A1* | 7/2007 | Zhou et al. | 370/395.2 |
| 2007/0217407 A1* | 9/2007 | Yuan et al. | 370/389 |
| 2007/0217579 A1* | 9/2007 | Sobti et al. | 379/67.1 |
| 2007/0223485 A1* | 9/2007 | Roesser | 370/395.1 |
| 2007/0237178 A1* | 10/2007 | Takahashi | 370/468 |
| 2009/0046706 A1* | 2/2009 | Chernow | 370/352 |
| 2011/0164497 A1* | 7/2011 | Takahashi | 370/230 |

OTHER PUBLICATIONS

Office Action dated Apr. 30, 2014 from the corresponding Chinese Patent Application No. 200780100501.5 with English Translation of the Office Action.

* cited by examiner

| SERVICE TYPE | VoIP CALL ORIGINATION | PSTN CALL ORIGINATION | VoIP CALL TERMINATION | PSTN CALL TERMINATION | CALL RECEPTION SERVICE IN VoIP COMMUNICATION | CALL RECEPTION SERVICE IN PSTN COMMUNICATION |
|---|---|---|---|---|---|---|
| 0 | ○ | △ | ○ | × | ○ | × |
| 1 | ○ | × | ○ | × | ○ | × |
| 2 | △ | ○ | × | ○ | × | ○ |
| 3 | × | ○ | × | ○ | × | ○ |

# ACCESS GATEWAY AND METHOD OF OPERATION BY THE SAME

CROSS-REFERENCE TO RELATED APPLICATION

This application is a continuation application based on International Application No. PCT/JP2007/067221, filed on Sep. 4, 2007, the contents being incorporated herein by reference.

TECHNICAL FIELD

The embodiments discussed herein are related to a platform provided with a function as a gateway to a core network for a Next Generation Network (NGN), that is, an access gateway (AGW).

BACKGROUND ART

In recent years, due to advances in DSL, FTTH, CATV, and other Internet technology, broadband access networks are rapidly spreading and utilization rates are becoming cheaper, so rapid progress is being made in establishing an environment for continuous connection to IP networks. For this reason, the environment is being established for enabling IP telephone and other various applications offered on IP networks to be easily utilized by numerous users.

Here, if viewed from communication networks as a whole, the changeover from communication networks based on public switched telephone networks (PSTNs) to communication networks based on IP (Internet Protocol) networks is accelerating. Regarding the former PSTN networks, various services and applications have been perfected after long years of effort. Thus, there is still a considerable difference from those offered by the latter IP networks. However, all of the various services and applications offered by PSTN networks were developed and provided under access infrastructures which are comprised of existing metal cables.

Under such a situation, operators have to move existing PSTN services etc., as they are, to the NGN while keeping the PSTN services running, that is, the so-called problem of "migration". The technique of just providing PSTN services etc. on Voice over Internet Protocol (VoIP) is not enough to solve the "migration" problem.

In recent years, a device has proposed which can flexibly cope with demands for such migration. This is the above access gateway (AGW). This is called a "Multi Service Access Node" (MSAN) as well. The AGW is a device enabling both PSTN and NGN services to be provided cost efficiently by various types of access technology, for example POTS (Plain Old Telephones Services), ISDN (Integrated Services Digital Networks), xDSL (x Digital Subscriber Lines), and PON (Passive Optical Networks). Thus, the device provides a platform provided with the function as a gateway to an NGN core network.

The carrier introduces such an AGW into the communication network so as to be able to continuously provide the above various existing services, while smoothly shifting the communication network to the NGN, and so as to be able to provide new services or applications under the above diverse access technology.

For example, by introducing the AGW, it is possible to provide voice services under the ISDN etc. in a conventional PSTN and simultaneously use the gateway function of the AGW to connect to a soft switch (SS), provided in the NGN, so as to provide IP telephone voice services using metal cables.

Note that, as related art relating to the embodiments, there is the following Patent Document 1. The Patent Document 1 discloses a VoIP gateway device which is designed to detour a call received from an ISDN terminal, from an IP network to a detour network so as to be received at the other party, even in a case where the number system utilized in the IP network differs from the number system utilized in the detour network.

Patent Document 1: Japanese Patent Publication (A) No. 2006-229303

As explained above, in the process of the changeover from a PSTN network to an NGN IP network, the progress in converting the core network to IP and the progress in converting the subscriber side access network to IP may not be identical, when compared with each other. For example the subscriber side access network, provided with an integrated access device (IAD) under it, may be rapidly converted to IP. In an area having such an advanced IP access network, many users seek further improvement of the quality of communication. For example, the quality of communication, for which improvement is sought, is a high quality of communication equivalent to the quality of communication offered by the existing PSTN.

SUMMARY

Therefore, the embodiments have, as their objects, the provision of an access gateway (AGW) which is connected to an integrated access device (IAD) through an access network and realizes high quality speech of the level of a PSTN.

Further, the embodiments have, as their objects, the provision of a method of operating such an access gateway.

Technical Solution

Figure 1:
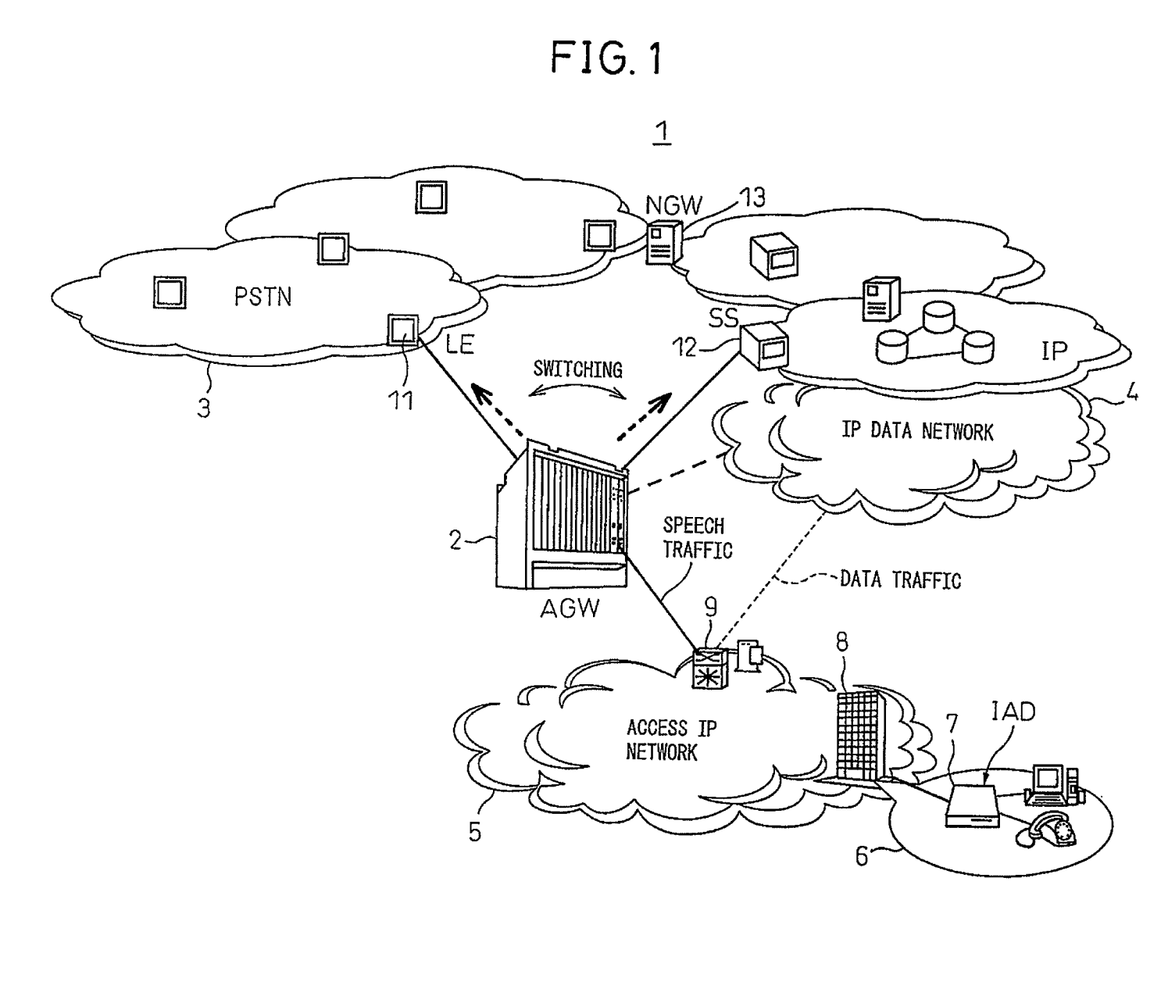
FIG. 1 is a view illustrating an example of the configuration of a communication network as a whole realized when introducing the access gateway (AGW) according to the embodiment.

FIG. 1 is a view illustrating an example of the configuration of the overall communication network realized when introducing an access gateway (AGW) according to the embodiment.

In FIG. 1, reference numeral 1 represents a communication network as a whole. At the center, an access gateway (AGW) 2 according to the present invention is shown. Aside from the AGW 2, everything else is comprised of existing network components. This AGW 2, for example, is mounted in the CO (Central Office).

As the networks themselves in the communication network 1, a PSTN network 3, IP network (IP data network) 4, and access network (access IP network) 5 are shown. Further, a LAN 6 is also shown, as an example.

The LAN 6 is provided, inside it, with an existing integrated access device (IAD). The IAD 7 is provided with functions for connections to the IP network 4 and speech. One of the main functions is a conversion of signals, from terminals such as telephones, to packets.

The IP packets from the IAD 7 include voice packets and data packets. In the past, these packets were transferred directly to a soft switch SS 12. Note that, in the figure, the components 8 and 9, shown in the access network 5, are respectively a certification office and access network node.

On the other hand, according to the embodiment, the voice packets and control packets from the IAD 7 are terminated once at the access gateway (AGW) 2 which relates to the embodiment and, after being terminated, are switched to the PSTN network route (3) or IP network route (4) in accordance with need (see "switching" in the figure). A conventional AGW was not configured to enable IP packets from the IAD 7 side to be freely switched to the IP network 4 side or the PSTN network 3 side.

In the figure, a voice signal at the PSTN network 3 side is transferred to a local exchange (LE) 11, while voice packets at the IP network 4 side are transferred to the soft switch (SS) 12 side.

Advantageous Effects of Invention (A) A conventional IAD 7 is housed in the soft switch (SS) 12. However, according to the embodiment, the IAD 7 is housed in the access gateway (AGW) 2. That is, the function of realizing IP telephone service for subscribers under the IAD 7 is housed in the AGW 2. Furthermore, connection routes from the AGW 2 to existing PSTN networks 3 are formed in this AGW 2.

The thus configured AGW 2, usually, can achieve a route switching between the two routes, i.e. (i) one route for providing IP telephone service through the soft switch (SS) 12 (IP network route) or (ii) the other route for providing a general PSTN telephone service through the local exchange (LE) 11 (PSTN network route), in accordance with need.

For example, when one of the higher networks, PSTN network 3 and IP network 4 for the AGW 2, encounters trouble or becomes congested, the other network can be switched to. Further, this switching can be performed automatically. This is the so-called "automatic reroute function". This can be triggered by notification of trouble from the SS 12 to the AGW 2 or by notification of the occurrence of trouble etc. from the LE 11 to the AGW 2. Therefore, it is possible to realize a communication network 1 with an extremely high reliability of communication.

(B) The types of the voice speech services provided by the carrier can be finely set at the AGW 2. For example, it becomes possible to freely select services of only the PSTN network route, services of only the IP network route, services able to be freely switched from one route to the other route, etc. Further, this can be realized by a single AGW, so there is no increase in the operating costs.

(C) The number system for fixed phones, e.g. 03, 06 and the number system for IP telephones, e.g. 050 are recognized by the AGW 2. Due to this, when the number of the call destination is the number of a fixed phone, that call can be directly connected from the AGW 2 to the PSTN network 3, while when it is the IP address of an IP network, that call can be transferred to the soft switch (SS) 12.

By way of note, in the past, when transferring the above call to the PSTN network 3, the call was transferred from the IP network 4 to the PSTN network 3 detouring via the network gateway (NGW) 13. Compared with this, under the embodiment, it is possible to directly connect the call to the PSTN network 3 without such a detour, and therefore possible to obtain the shortest route.

This lightens the load of the NGW 13, and therefore stabilizes the communication network 1 as a whole.

(D) This is beneficial to users who are engaging in particularly important communication. Under current IP telephones, speech would be delayed or flicker or would be partially lost. Therefore, a high quality of speech on the level of general fixed phones would not be guaranteed.

For the reason, if there is an instruction of indicating an important communication or making emergency call (110 or 119) or other important communication, the AGW 2 recognizes the important call and transfers that call to the higher quality of communication and stabler PSTN network 3 side route. It is also possible to raise the success rate of reaching destination.

DESCRIPTION OF EMBODIMENTS

Figure 2:
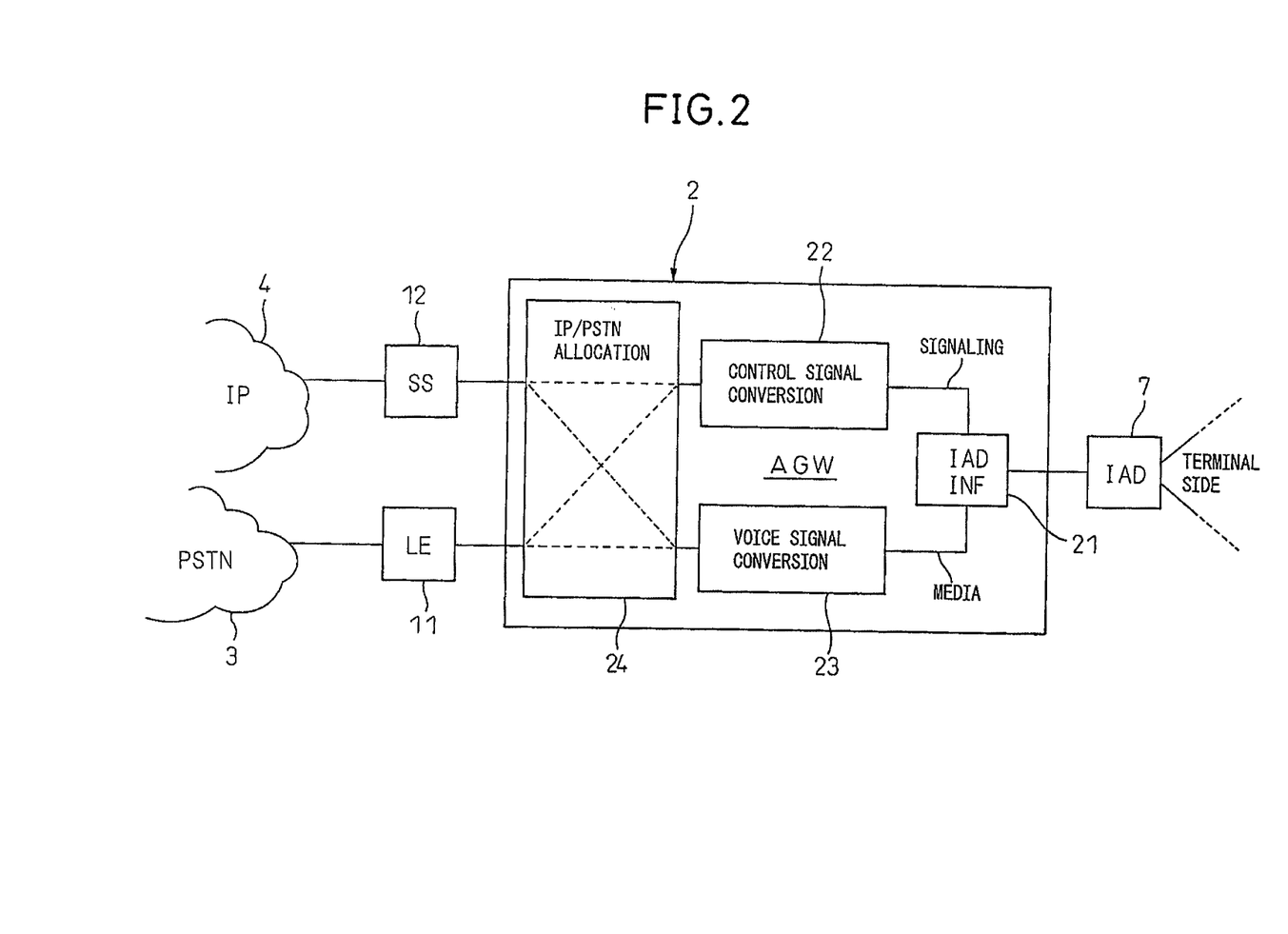
FIG. 2 is a view illustrating an outline of an access gateway (AGW) 2 according to the embodiment.

FIG. 2 is a view illustrating an outline of the access gateway (AGW) 2 according to the embodiment.

Note that, in the figure, adjoining components connected to the AGW 2 such as an integrated access device (IAD) 7, PSTN network 3 side local exchange (LE) 11, and IP network 4 side soft switch (SS) 12 are also described.

The AGW 2 of this figure is, first, provided with an IAD interface (IAD INF) 21 for receiving IP packets from the IAD 7. The IP packets, input to this IAD interface 21, are control packets and voice packets.

The control packets coming through the IAD interface 21 are input to a control signal conversion function unit 22 where these packets are converted to control information. On the other hand, the voice packets coming through the IAD interface 21 are input to a voice signal conversion function unit 23 where these packets are converted to voice information.

The above converted control signal (information) and voice signal (information) are input to an IP/PSTN allocation function unit 24 where the IP packets to be transferred to the soft switch (SS) 12 are allocated to the SS 12 side and a time division multiplex (TDM) signal to be transferred to the local exchange (LE) 11 is allocated to the LE 11 side.

Here, the above control signal conversion function unit 22 performs protocol conversion between a first protocol which defines transfer control between the IAD 7 and IAD interface 21 and a second protocol which defines transfer control between the IP/PSTN allocation function unit 24 and the soft switch (SS) 12 and protocol conversion between a third protocol which defines transfer control between the IP/PSTN allocation function unit 24 and the local exchange (LE) 11 and the above first protocol.

Furthermore, the above control signal conversion function unit 22 performs address conversion between the IP addresses of the first IP packets transferred between the IAD 7 and IAD interface 21 and the IP addresses of the second IP packets transferred between the IP/PSTN interface 24 and soft switch (SS) 12 and number-address conversion between the telephone numbers of the TDM signals transferred between the IP/PSTN interface 24 and local exchange (LE) 11 and IP addresses of the above first IP packets.

Note that the above operation is described for uplink control from the lower IAD 7 side to the higher network (3, 4) side, but the opposite downlink control from the higher network (3, 4) side to the lower IAD 7 side is performed by control opposite to the above.

Figure 3:
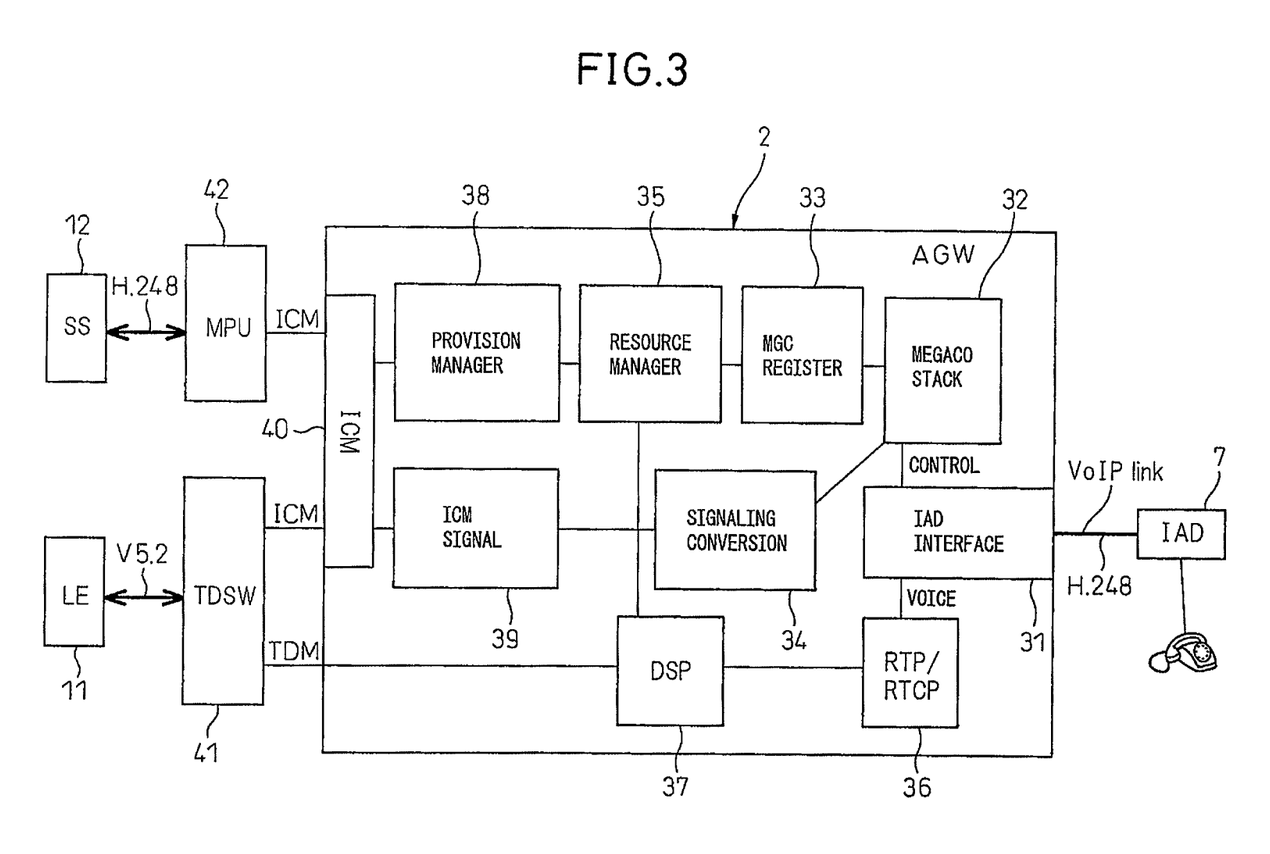
FIG. 3 is a view illustrating an access gateway (AGW) 2 according to an embodiment of the embodiment.

FIG. 3 is a view illustrating an access gateway (AGW) 2 according to the embodiment. The configuration of this figure specifically shows an outline of the configuration of the AGW 2 shown in FIG. 2 based on an actual hardware configuration.

If viewed from the integrated access device (IAD) 7 side of this figure, one end of the AGW 2 is provided with an IAD interface module 31. This corresponds to the IAD interface (IAD INF) in FIG. 2. This module 31 receives, as input, the IP packets from the IAD 7 through for example a VoIP link based on the protocol H.248. These packets are separated, at this module 31, into control packets and voice packets.

The above separated control packets are input, first, to a MEGACO stack module 32. Note that the module 32 and the later explained modules 33, 34 form the control signal conversion function unit 22 of FIG. 2. Note that the above modules 33 and 34 receive commands from a module 35 and module 38 as well. The MEGACO (Media Gateway Control Protocol) stack module 32 performs protocol control which is necessary for providing IP telephone services.

The next stage Media Gateway Control (MGC) register module 33 registers information regarding the subscribers accommodated under the IAD 7 and monitors the state of speech sent and received by the subscribers.

The above MEGACO stack module 32 cooperates with the above MGC register module 33 and signaling conversion module 34. The signaling conversion module 34 performs protocol conversion between the above-mentioned first protocol (AGW-IAD) and the above-mentioned second protocol (SS-AGW) and performs protocol conversion between the first protocol and the above-mentioned third protocol (LE-AGW) (see FIG. 4 mentioned later).

The signaling conversion module 34 further performs the above-mentioned address conversions. That is, the module 34 converts addresses between IP addresses of packets transferred between the AGW and IAD and IP addresses of packets transferred between the SS and AGW. The module 34 also performs address-number conversion between IP addresses between the AGW and IAD and telephone numbers between the LE and AGW (see FIG. 5 mentioned later).

On the other hand, the above voice packets from the IAD interface module 31 are input, first, to the RTP/RTCP module 36. Note that the module 36 and the later explained modules 35 and 37 form the voice signal conversion function unit 23 of FIG. 2.

The RTP (Real-time Transport Protocol)/RTCP (Real-Time Control Protocol) module 36 performs processing for converting voice packets into RTP packets.

The voice packets coming through the RTP/RTCP module 36 are input to the DSP module 37. The DSP module 37 digitally converts the voice packets coming through the module 36 to a TDM signal for the PSTN network and, further, digitally processes the voice packets coming through the module 36 to signals for the IP network and then transfers them to module 39→40→42.

In this case, the DSP module 37 is managed by the resource manager module 35. That is, the module 35 monitors speech traffic established in the AGW while managing the DSP resources so as to prevent congestion.

On the other hand, the provision manager module 38 directs a speech control, such as set up, for the subscribers accommodated under the IAD 7, which forms a main part of the aforesaid IP/PSTN allocation function unit 24 of FIG. 2. Furthermore, the allocation function unit 24 includes a TDM switch (TDSW) 41 and a processor (MPU) 42. Due to the functions of the module 38, a function of IP telephone service for the subscribers under the IAD can be realized inside the AGW 2. By way of note, the above function is conventionally realized inside the SS 12.

The above TDM switch (TDSW) 41 controls the transfer of TDM signals with the LE 11 by, for example the existing protocol of V5.2. On the other hand, the above processor (MPU) 42 controls the transfer of IP packets with the SS 11 by, for example, the existing protocol of H.248.

Note that the above modules 31 to 38 are usually formed dispersedly on a plurality of cards. For this reason, in actuality, signals and information are transferred among these cards. Such transfer among cards is performed by an inter-card message (ICM) signal module 39 and ICM module 40.

As explained above, in FIG. 3, the control signal conversion function unit 22 shown in FIG. 2 is comprised of at least the MEGACO stack module 32 for protocol control, the MGC register module 33 for monitoring the state of the subscriber's speech under the IAD, and the signaling conversion module 34 for protocol conversion, IP address conversion, and number-address conversion.

On the other hand, the voice signal conversion function unit 23 shown in FIG. 2 is comprised of the RTP/RTCP module 36 for receiving, as input, voice packets and the DSP module 37 for digitally processing voice packets, coming from the module 36, to signals directed to the LE 11 side and SS 12 side.

Further, the IP/PSTN allocation function unit 24 (FIG. 2) includes the provision manager module 38 for directing various speech control for all subscribers under the IAD 7, a TDM switch 41 for transferring TDM signals from the DSP 37, by a predetermined protocol, with the LE 11 under the direction by the module 38, and the processor (MPU) 42 for transferring IP packets from the DSP 37, by a predetermined protocol, with the SS 12.

When the above processor 42 receives a notice of trouble etc. from the higher SS 12, the current speech path is switched to the speech path through the TDM switch 41 by means of the provision manager module 38.

When the above TDM switch 41 receives a notice of trouble etc. from the higher LE 11 side, the current speech path is switched to the speech path through processor 42 by means of the provision manager module 38.

The route to the PSTN is formed by first establishing a link between the IAD 7 and MGC register module 33 by the MEGACO stack module 32, converting protocol of the control signals, for example H2.48-ICM-V5.2, between the module 32 and TDM switch 41 and then establishing signaling between the LE 11 and IAD 7.

On the other hand, for voice signals, the IAD interface module 31, RTP/RTCP module 36 and TDM switch 41 are used to convert voice packets to TDM signals and then establishing a speech path with the LE 11.

On the other hand, the route to the IP network is formed by first establishing a link between the IAD 7 and MGC register module 33 by the MEGACO stack module 32, registering the subscriber in the SS 12 by the routine through the provision manager 38→processor (MPU) 42, and then establishing signaling between the SS 12 and IAD 7.

On the other hand, the voice packets are transferred through the processor 42 to the SS 12, whereby a speech path is established between the IAD 7 and the SS 12.

Figure 4:
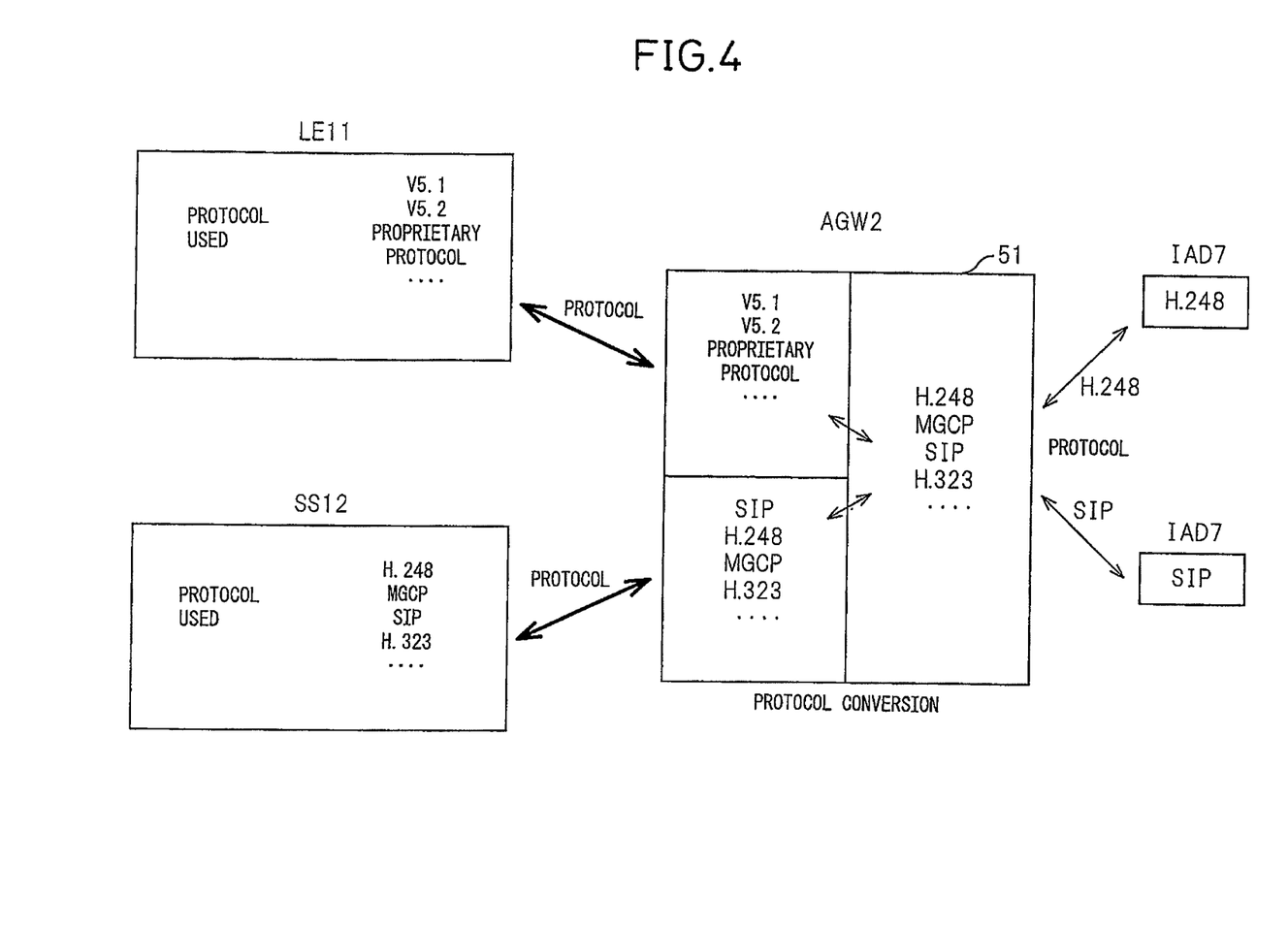
FIG. 4 is a view illustrating protocol conversion in an access gateway (AGW) 2.

FIG. 4 is a view illustrating a protocol conversion in the access gateway (AGW) 2. Reference numeral 51 in the figure indicates a protocol conversion table. The conversion table 51 can be formed in the signaling conversion module 34 (FIG. 3). According to the example of this illustration, a certain IAD 7 uses the protocol H.248, while another IAD 7 uses the SIP, but table 51 may also be used to handle MGCP, H.323, etc.

Further, the LE 11 can also be handled by the V5.1 or proprietary protocol in addition to the existing V5.2.

On the other hand, the SS 12 can also be handled by the MGCP, SIP, H.323, etc. in addition to the existing H.248.

Figure 5:
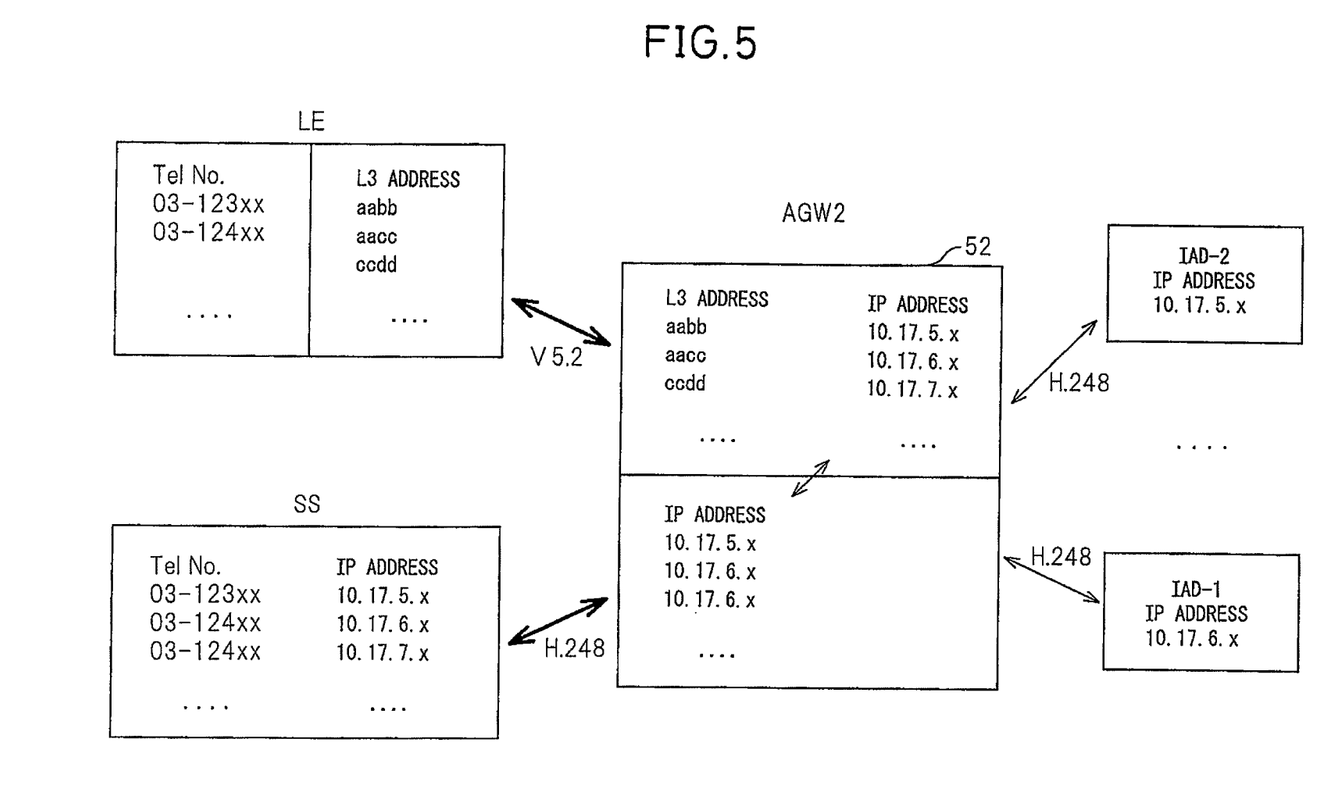
FIG. 5 is a view illustrating an example of IP address (number-address) conversion at the access gateway (AGW) 2.

FIG. 5 is a view illustrating an example of IP address (number-address) conversion in the access gateway (AGW) 2. Reference numeral 52 in the figure represents the address (number) conversion table. The conversion table 52 is formed in the signaling conversion module 34 (FIG. 3), which is realized by cooperation with the aforesaid provision manager module 38 which monitors input addresses or input telephone numbers (FIG. 3). As illustrated, a one-to-one correspondence between the numbers (LE) of the LE 11 and IP addresses (AGW 2) is established through, for example, the addresses of the layer 3 (L3 ADDRESS).

Figure 6:
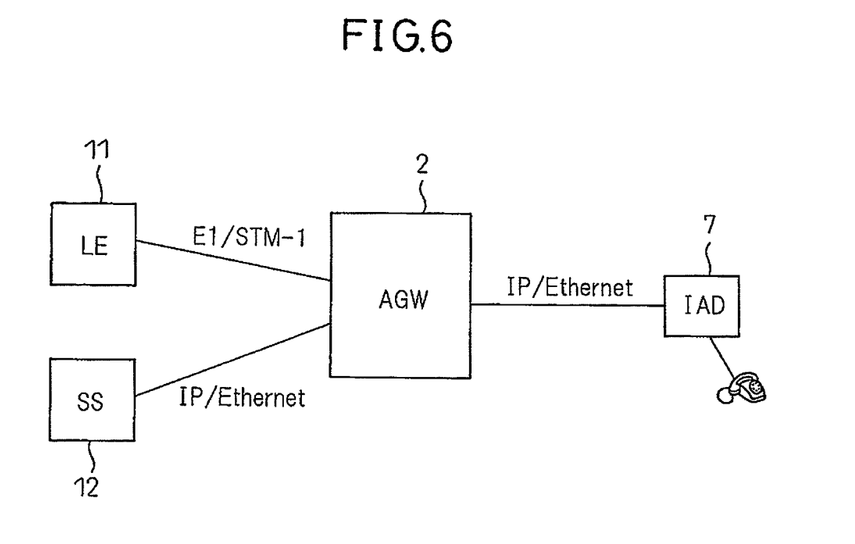
FIG. 6 is a view illustrating an example of a physical layer interface used for connection with the access gateway (AGW) 2.

FIG. 6 is a view illustrating an example of a physical layer interface used when using the access gateway (AGW) 2 of the embodiment. As illustrated in the figure, for the physical layer interface between the AGW 2 and SS 12, it is possible to use an IP/Ethernet® similar to the physical layer interface with the IAD 7. On the other hand, as the physical layer interface between the LE 11 and the AGW 2, it is possible to use an E1 or STM-1.

It was explained as above, the AGW 2 is able to secure a quality equivalent to the PSTN communication even with IP communication in accordance with need. If expanding the applications furthermore, the AGW 2 enables various operations for other services.

Figure 7:
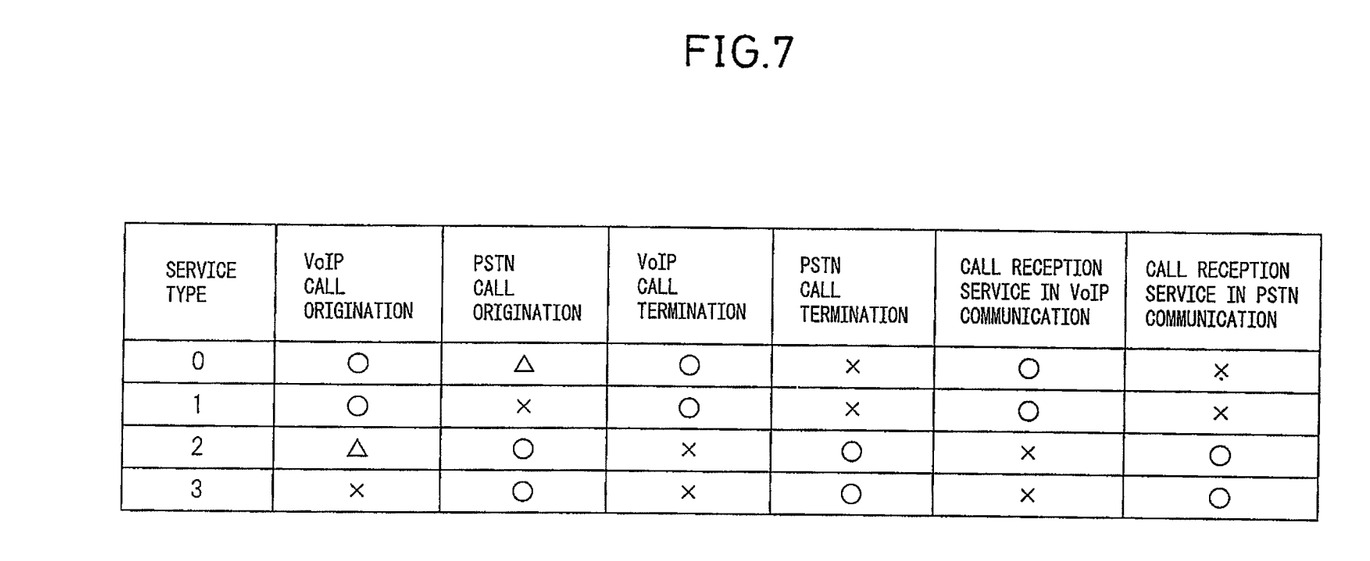
FIG. 7 is a view for explaining an example of a method of operation by an access gateway (AGW) 2 of the embodiment.

FIG. 7 is a view for explaining an example of a method of operation by the access gateway (AGW) 2 of the embodiment. By using the AGW 2, the carrier can provide various services to the IAD subscribers such as the service type 0 to service type 3 as illustrated.

The service type 0 provides mainly VoIP communication (Good), but in accordance with need also allows calls to the PSTN (Fair), while the service type 1 enables only VoIP communication.

The service type 2 provides mainly PSTN communication (Good), but in accordance with need also allows VoIP calls (Fair), while the service type 3 enables only PSTN communication.

The above service types can be set at the provision manager module 38 (FIG. 3).

The invention of the AGW according to the embodiment, enabling the above operations, may also be grasped as a method invention of operation by the AGW. The steps of the method are 1) providing, in the AGW 2, functions of realizing IP telephone service for subscribers accommodated under the subscriber side IAD 7, 2) selectively forming a PSTN side speech path with the PSTN network 3 through the LE 11 or an IP side speech path with the IP network 4 through the SS 12, as the IP telephone service for subscribers, 3) performing a protocol conversion, for forming the above PSTN and IP side speech paths, between the protocol used between the IAD 7 and AGW 2 and the protocol used between the AGW 2 and LE 11 or AGW 2 and SS 12 and 4) performing a conversion, for forming the above PSTN and IP side speech paths, between the addresses of IP packets transferred between the IAD 7 and AGW 2 and telephone numbers or IP addresses of speech signals transferred between the AGW 2 and LE 11 or AGW 2 and SS 12.

Further, the steps further include 5) monitoring, at the AGW 2, whether trouble etc. has occurred at the SS 12 side and, 6) switching, when the above trouble occurs and the AGW 12 determines the trouble, the current speech path formed with the IP network 4 to the other speech path formed through the LE 11.

EXPLANATION OF REFERENCES

1 communication network
2 access gateway (AGW)
3 PSTN network
4 IP network
5 access network
7 integrated access device (IAD)
11 local exchange (LE)
12 soft switch (SS)
13 network gateway (NGW)
21 IAD interface (IAD INF)
22 control signal conversion function unit
23 voice signal conversion function unit
24 IP/PSTN allocation function unit
31 IAD interface module
32 MEGACO stack module
33 MGC register module
34 signaling conversion module
35 resource manager module
36 RTP/RTCP module
37 DSP (digital signal processor) module
38 provision manager module
41 TDM switch (TDSW)
42 processor (MPU)
51 protocol conversion table
52 address (number) conversion table

What is claimed is:

1. An access gateway comprising:
   an IAD interface for receiving IP packets comprised of control packets and voice packets both sent from an integrated access device (IAD) together, to perform IP telephone service functions for each subscriber selectively in the access gateway, instead of performing IP telephone service functions for subscribers in the integrated access device (IAD);
   a control signal converter receiving, as input, said control packets from said IAD interface and converting the control packets to control information;
   a voice signal converter receiving, as input, said voice packets from said IAD interface and converting the voice packets to voice information; and
   an allocating circuit, connected to both soft switch (SS) at the IP network side and local exchange (LE) at the PSTN side, allocating said IP packets to either the soft switch (SS) or the local exchange (LE) upon receiving both said converted control information and said converted voice information applied from said control signal converter and voice signa converter, respectively, switching a current speech path, when a notification of trouble from the soft switch (SS) is received, to a PSTN speech path automatically or switching a current speech path, when a notification of trouble from the local exchange (LE) is received, to an IP speech path automatically, wherein, the access gateway is operative to perform protocol conversion between a first protocol defining transfer control of said IP packets and second protocol defining transfer control from said allocating circuit to said soft switch (SS), protocol conversion between said first protocol and a third protocol defining transfer control from said allocating circuit to said local exchange (LE), address conversion between the IP addresses of the IP packets transferred at said integrated access device (IAD) side and the IP addresses of the IP packets transferred at the soft switch (SS) side, and number-address conversion between the IP addresses of said IP packets transferred at said integrated access device (IAD) side and telephone numbers of TDM signals transferred at the local exchange (LE) side.

2. The access gateway according to claim 1, wherein
said first protocol includes any of H.248, MGCP, SIP, and H.323,
said second protocol includes any of H.248, MGCP, SIP, and H.323, and
said third protocol includes any of V5.1, V5.2, and a proprietary protocol.

3. The access gateway according to claim 1, wherein said control signal converter comprising:
an IAD interface circuit connecting with said integrated access device (IAD);
a Media Gateway Control Protocol (MEGACO) stack circuit connecting to said IAD interface circuit and controlling the protocol for the IP telephone service;
a Media Gateway Control (MGC) register circuit connecting to said MEGACO stack circuit, registering information regarding subscribers accommodated under said integrated access device (IAD), and monitoring a state of the subscriber's speech; and
a signaling conversion circuit connecting to said MEGACO stack circuit and performing said protocol conversion and said address conversion.

4. The access gateway according to claim 1, wherein said voice signal converter comprising:
an IAD interface circuit connecting with said integrated access device (IAD);
an RTP/RTCP circuit connecting to said IAD interface circuit and converting said IP packets to RTP packets;
a DSP circuit receiving, as input, output packets from said RTP/RTCP circuit and digitally processing these packets to form a TDM signal directed to said local exchange (LE) and, further, receiving, as input, said output packets and digitally processing these packets to form IP packet signals directed to said soft switch (SS); and
a resource manager circuit managing resources of said DSP circuit.

5. The access gateway according to claim 4, comprising:
a processor transferring the digital signal output from said DSP circuit to said soft switch (SS) in accordance with said second protocol; and
a TDM switch transferring the digital signal output from said DSP circuit to said local exchange (LE) in accordance with said third protocol.

6. The access gateway according to claim 5 wherein said processor, TDM switch, and a provision manager circuit form said allocating circuit, the provision manager circuit monitors speech communication of the subscribers accommodated under said integrated access device (IAD) and controls delivery of said IP packets from said processor and TDM signals from said TDM switch.

7. A method of operation by an access gateway comprising:
receiving IP packets, at an IAD interface, comprised of control packets and voice packets both sent from an integrated access device (IAD) together, to perform IP telephone service functions for each subscriber selectively in the access gateway, instead of performing IP telephone service functions for subscribers in the integrated access device (IAD);
receiving, at a control signal converter, said control packets from said IAD interface;
converting, at the control signal converter, the received control packets to control information;
receiving, at a voice signal converter, said voice packets from said IAD interface;
converting, at the voice signal converter, the received voice packets to voice information;
applying both the converted control information and the converted voice information received from said control signal converter and said voice signal converter, respectively, to an allocating circuit;
allocating, at the allocating circuit connected to both a soft switch (SS) at an IP network side and a local exchange (LE) at a PSTN side, said IP packets to either the soft switch (SS) or the local exchange (LE) upon receiving both the converted control information and the converted voice information;
switching a current speech path, when a notification of trouble from the soft switch (SS) is received, to a PSTN speech path automatically or switching a current speech path, when a notification of trouble from the local exchange (LE) is received, to an IP speech path automatically; and
providing functions of realizing IP telephone service for subscribers accommodated under said integrated access device (IAD), wherein, the access gateway is operative to perform protocol conversion between a first protocol defining transfer control of said IP packets and second protocol defining transfer control from said allocating circuit to said soft switch (SS), protocol conversion between said first protocol and a third protocol defining transfer control from said allocating circuit to said local exchange (LE), address conversion between the IP addresses of the IP packets transferred at said integrated access device (IAD) side and the IP addresses of the IP packets transferred at the soft switch (SS) side, and number-address conversion between the IP addresses of said IP packets transferred at said integrated access device (IAD) side and telephone numbers of TDM signals transferred at the local exchange (LE) side.

8. The method of operation by the access gateway according to claim 7, further comprising
monitoring if trouble occurs at said soft switch (SS) side and
switching, when judging that trouble occurs, said speech path formed with said soft switch (SS) to the speech path formed with said local exchange (LE).

9. The method of operation by the access gateway according to claim 7, selectively providing:
first communication services mainly comprising IP communication with said IP network and allowing PSTN communication with said PSTN network, second communication services limited to only IP communication with said IP network,
third communication services mainly comprising PSTN communication with said PSTN network and allowing IP communication with said IP network, and
fourth communication services limited to only PSTN communication with said PSTN network.

* * * * *